May 27, 1930.  A. C. HOWARD  1,759,902
PLATFORM SCALE
Filed Aug. 12, 1927
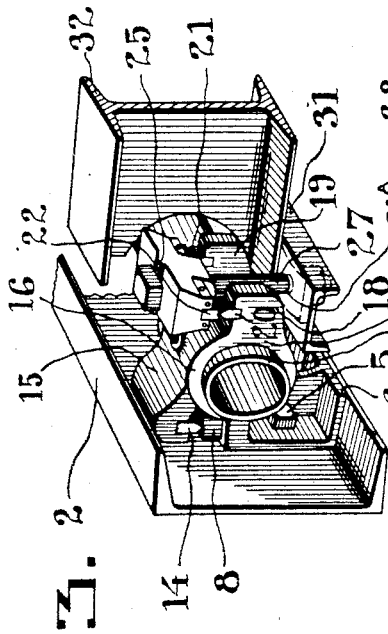
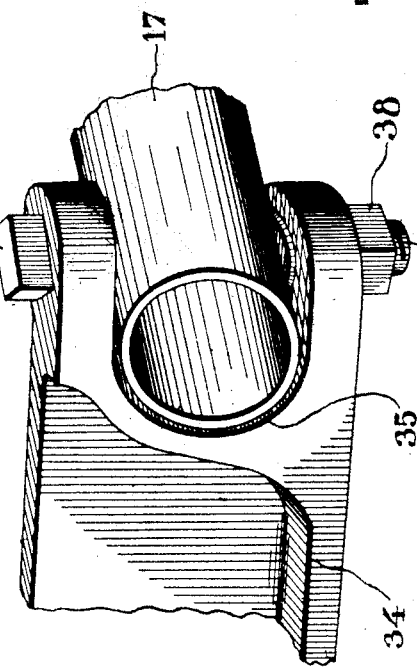
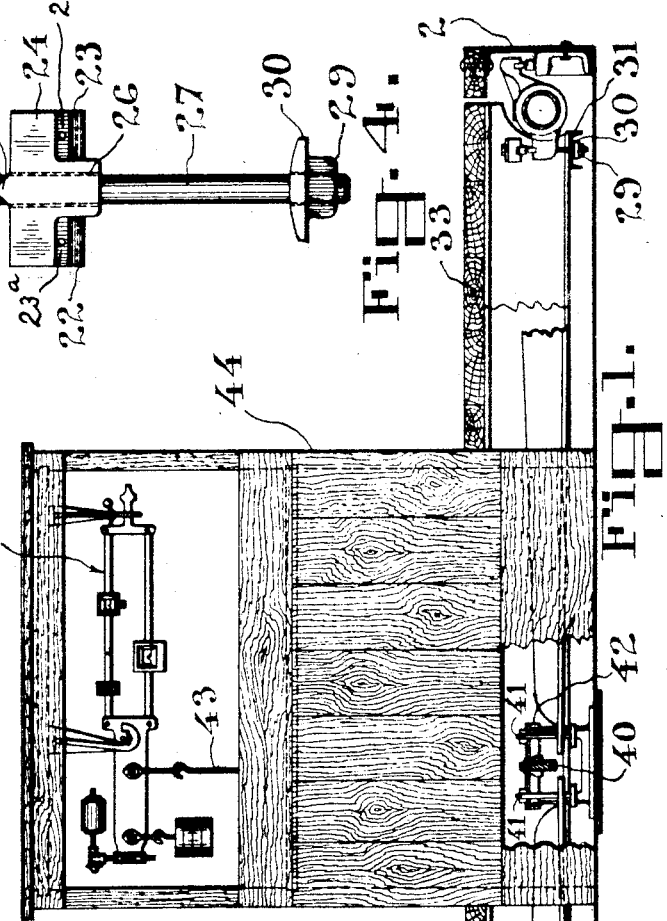
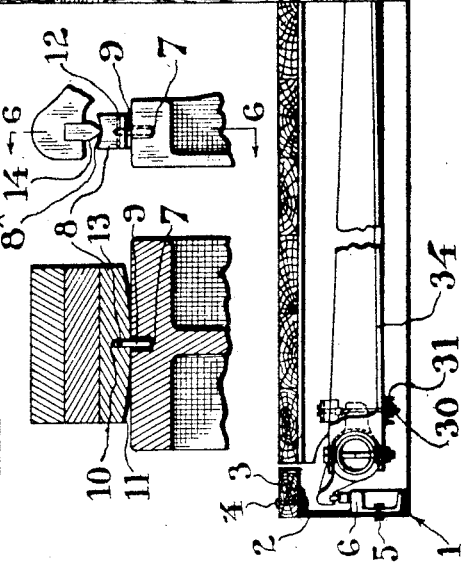
INVENTOR
ALFRED C. HOWARD
BY
Henry Sherman
ATTORNEY Patented May 27, 1930

1,759,902

UNITED STATES PATENT OFFICE

ALFRED COLQUITT HOWARD, OF EAST MOLINE, ILLINOIS, ASSIGNOR TO E. AND T. FAIRBANKS AND COMPANY, OF ST. JOHNSBURY, VERMONT, A CORPORATION OF VERMONT

PLATFORM SCALE

Application filed August 12, 1927. Serial No. 212,480.

This invention relates to weighing scales and more particularly to scales of relatively large capacity, such as wagon or truck scales, and which are generally known as "pitless" scales.

An important object of the invention is the provision of an improved scale characterized by a greater flexibility and freedom of movement, the construction and arrangement being such that better maintenance of balance and greater accuracy are the result.

Another important object of the invention is to provide, in a scale organization designed to utilize transverse cylindrical members, commonly termed "pipe levers", a swivel splice between the pipe lever and the extension arm so that there may be lateral play in the extension arm, a feature of marked importance having the advantages of giving at all times a plumb connection between the splice and the transverse extension, or "fifth", lever and compensating for slight errors in the manufacture and erecting of the scale parts.

It is a further object of this invention to provide a V-bearing steel to support the fulcrum pivot which is self-aligning in vertical and horizontal planes thereby giving at all times a line-to-line contact between the bearing and the knife edged pivots.

It is furthermore an object of this invention to provide a load bearing block having two self-aligning bearings supported on a bifurcated knife edge pivot, the load being suspended from said bearing block by means of a single bolt, this construction permitting the platform to move both laterally and longitudinally.

Other features of this invention, together with certain details of construction and combination of parts, will be discussed in the specification and pointed out in the appended claims.

In the accompanying drawings:

Fig. 1 is a rear elevational view of a scale embodying the invention, a portion of the beam box and steel frame being broken away to show the details of construction;

Fig. 2 is a detail view of the splice connection between the pipe lever and the extension arm;

Fig. 3 is a detail view of the corner construction;

Fig. 4 is a detail view of the bearing block and suspension bolt;

Fig. 5 is a detail view showing the fulcrum bearing construction and arrangement; and Fig. 6 is a cross-sectional elevation taken on line 6—6 in Fig. 5.

Referring to the drawings for the preferred embodiment of the invention, the rectangular frame 1 of the scale is usually constructed of channel beams, having the flanges thereof turned inwardly and comprises end beams 2 and side beams (not shown) rigidly joined at their ends. This frame may be placed on any suitable bed, as is well understood in the art. A coping 3 is attached to the upper flanges of the channel beams by bolts 4 and extends about the four sides of the frame.

Suitably attached to each end beam 2, as by means of bolts 5, are two chairs 6. In the upper surface of each chair is formed an aperture 7 in which is swivelly mounted a bearing steel 8 by means of a pin 9 extending into the aperture 7 and into a smaller aperture 10 in the rounded portion 11 of the bearing steel 8. The bearing steel 8 is formed of a steel block substantially rectangular in horizontal cross-section, the lower surface of said block being curved in order that the bearing may have a rocking motion on the upper surface of the chair 6. The swivel pin 9 is suitably retained in the bearing aperture by means of a pin 12 passing through an eye 13 formed in the upper extremity of the swivel pin. This construction of the bearing organization is such that it is self-aligning in vertical and horizontal planes and enables the knife-edge pivot 14, set in arm 15 of a sleeve 16, to make at all times a line-to-line contact with the V-shaped groove 8ª formed in the upper surface of bearing steel 8.

The sleeve 16 is rigidly attached to a transverse cylindrical member, or pipe lever, 17. Integral with the sleeve 16 is a projection 16ª extending inwardly of the scale, the projection being bifurcated to form arms 18 and 19 in the upper surfaces of which are set the knife-edge pivots 20 and 21. Supported on these knife-edges are the bearing steels 22 and 23 which are pivotally mounted on pins 23ª in bearing block 24.

In the upper surface of the bearing block 24 is formed a transverse rib 25, the purpose of which will hereinafter be described. The bearing block also has a central vertical opening 26 through which passes a suspension bolt 27 having a head 28 at its upper extremity arranged to bear on rib 25, said rib acting as a fulcrum on which the head of the suspension bolt is adapted to rock. On the threaded lower extremity of the bolt is screwed a nut 29 which retains a rocker washer 30. Supported by the suspension bolt and resting on the rocker washer is a cross bar 31 of channel iron which extends parallel to the pipe lever, the cross bar being retained in position by the suspension bolt passing through an aperture 31ª near the end thereof. The cross bars sustain the I-beam platform girders 32 on which is located the usual floor of planks 33. This construction being such that, when a load comes on the platform the shock incident thereto will be absorbed by the suspension bolt cooperating with the rib on the bearing block and the platform will come to a plumb condition without destroying the alignment or the position of the bearings relative to the pivots.

The height of the floor 33 is adjustable vertically through the medium of nut 29 cooperating with the suspension bolt, it being desirable to maintain the level of the floor in the plane of the coping.

Extending along the inner side of the frame and longitudinally thereof are the extension arms 34 which have bifurcated end portions 35 in which bifurcations are swivelly mounted on bolts 37, the inner extremities of pipe levers 17. A nut 38 screwed on the threaded end of bolt 37 retains said bolt in position. The ends of extension arms 34 remote from the bifurcations are connected to the transverse extension lever 40 by means of loops 41 suspended from knife-edge pivot 42. This construction permits a lateral play at the splice and the transverse extension, or "fifth" lever.

The transverse extension lever is connected to the steelyard rod 43 extending upwardly through the beam box 44, the upper end of the steelyard rod being connected to the beam outfit 45, as is well understood in the art.

Having thus described my invention, what I claim as new and desire to secure by Letters Patent of the United States, is:

1. In a device of the character described, the combination with a frame and a plurality of levers supported thereon, of extension levers rotatably connected to said levers.

2. In a device of the character described, the combination with a frame and a plurality of levers supported thereon, of extension levers swivelly connected to said levers.

3. In a device of the character described, the combination with a frame and a plurality of pipe levers supported thereon, of extension arms swivelly connected to said levers.

4. In a device of the character described, the combination with frame and a plurality of pipe levers pivoted thereon, of extension arms swivelly connected to said levers.

5. In a device of the character described, the combination with frame and a plurality of pipe levers pivoted thereon, of extension arms having a bifurcated end portion, said pipe levers being rotatably mounted in said bifurcated end portions.

6. In a device of the character described, the combination with a frame and a plurality of pipe levers pivoted thereon, of an extension arm having a bifurcation in one end thereof connected to each pipe lever, and a bolt traversing the bifurcation, said pipe lever being mounted on said bolt.

7. In a device of the character described, the combination with a pipe lever, of a bearing block mounted thereon, a bolt rockably mounted on said bearing block, platform supporting means and means on said bolt adapted to support said platform supporting means.

8. In a device of the character described, the combination with a pipe lever, of a bearing block mounted thereon, a bolt rockably mounted on said bearing block, platform supporting means, and means on said bolt adapted to rockably support said platform supporting means.

9. In a device of the character described, the combination with a pipe lever, of a bearing block pivotally mounted thereon, a rib on said bearing block, a bolt rockably mounted on said rib, platform supporting means, and means on said bolt adapted to rockably support said platform supporting means.

10. In a device of the character described, the combination with a pipe lever, of a bearing block pivotally mounted thereon, a rib on said bearing block, a bolt having a head fulcrumed on said rib, platform supporting means and a washer on said bolt adapted to rockably support said platform supporting means.

11. In a device of the character described, the combination with a pipe lever, of a bearing block, having an aperture therein, pivotally mounted on said pipe lever, a rib on said bearing block, a bolt extending through said aperture, said bolt having a head fulcrumed on said rib, platform supporting means and a washer on said bolt adapted to rockably support said platform supporting means.

12. In a device of the character described, the combination with a pipe lever, of a bearing block, having an aperture extending vertically therethrough, pivotally mounted on said lever, a rib on said bearing block, a bolt passing through said aperture, the diameter of the bolt being less than the diameter of the aperture, said bolt having a head thereon fulcrumed on said rib, platform supporting means and a washer on said bolt adapted to rockably support said platform supporting means.

13. In a device of the character described, in combination, a frame, a pipe lever pivotally mounted thereon, an arm on said pipe lever, said arm being bifurcated, a knife edge pivot in each bifurcated portion, a bearing block, said bearing block having bearing steels pivotally mounted therein adapted to rest on said pivots, and platform supporting means suspended from said bearing block.

14. In a device of the character described, in combination, a frame, a chair on said frame, a compensating bearing steel mounted on said chair, a pipe lever pivoted on said bearing steel, a bearing block pivotally supported on said bearing block, a bolt having a head fulcrumed on said rib and adapted to rock thereon, platform supporting means, and means on said bolt for rockably supporting said platform supporting means.

15. In a device of the character described, in combination, a frame, a chair on said frame, a bearing steel having a rounded portion resting on said chair, a pipe lever pivoted on said bearing steel, a bearing block pivotally supported on said lever, a rib on said bearing block, a bolt having a head fulcrumed on said rib and adapted to rock thereon, platform supporting means, and means on said bolt for rockably supporting said platform supporting means.

In testimony whereof I have signed my name to this specification.

ALFRED COLQUITT HOWARD.